US008515626B2

(12) United States Patent
Chiocco

(10) Patent No.: US 8,515,626 B2
(45) Date of Patent: Aug. 20, 2013

(54) SYSTEM AND METHOD FOR MACHINE GUIDANCE CONTROL

(75) Inventor: Gregory Daniel Chiocco, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 988 days.

(21) Appl. No.: 12/177,777

(22) Filed: Jul. 22, 2008

(65) Prior Publication Data

US 2010/0018726 A1 Jan. 28, 2010

(51) Int. Cl.
*A01B 76/00* (2006.01)

(52) U.S. Cl.
USPC .............. 701/50; 701/41; 701/31.4; 340/588; 340/990; 172/1; 172/2

(58) Field of Classification Search
USPC ............. 172/1, 2; 701/213, 41, 50; 340/588, 340/990
See application file for complete search history.

(56) References Cited

U.S. PATENT DOCUMENTS

| 3,351,895 | A | 11/1967 | Cupp |
| 5,440,301 | A | 8/1995 | Evans |
| 5,684,691 | A * | 11/1997 | Orbach et al. ................... 700/56 |
| 5,928,309 | A | 7/1999 | Korver |
| 6,052,647 | A | 4/2000 | Parkinson et al. |
| 6,061,632 | A | 5/2000 | Dreier |
| 6,278,918 | B1 | 8/2001 | Dickson |
| 6,389,345 | B2 * | 5/2002 | Phelps ............................. 701/50 |
| 6,501,422 | B1 | 12/2002 | Nichols |
| 6,711,501 | B2 * | 3/2004 | McClure et al. ................. 701/23 |
| 6,804,587 | B1 | 10/2004 | O Connor |
| 6,845,311 | B1 | 1/2005 | Stratton |
| 7,162,348 | B2 | 1/2007 | McClure |
| 7,400,956 | B1 | 7/2008 | Feller |
| 7,400,957 | B2 * | 7/2008 | Hofer et al. ...................... 701/41 |
| 7,437,230 | B2 * | 10/2008 | McClure et al. ................. 701/50 |
| 7,490,678 | B2 * | 2/2009 | Unruh et al. ...................... 172/2 |
| 7,545,319 | B2 | 6/2009 | Orler |
| 7,580,783 | B2 * | 8/2009 | Dix .................................. 701/50 |
| 7,623,952 | B2 * | 11/2009 | Unruh et al. .................... 701/50 |
| 8,401,744 | B2 * | 3/2013 | Chiocco .......................... 701/50 |
| 2004/0124605 | A1 | 7/2004 | McClure |
| 2005/0288834 | A1 | 12/2005 | Heiniger |
| 2006/0011402 | A1 | 1/2006 | Green |
| 2006/0282205 | A1 | 12/2006 | Lange |
| 2007/0005208 | A1 | 1/2007 | Han |
| 2007/0021913 | A1 | 1/2007 | Heiniger |
| 2007/0198185 | A1 | 8/2007 | McClure |
| 2008/0147282 | A1 | 6/2008 | Kormann |
| 2008/0177449 | A1 | 7/2008 | Pickett |
| 2008/0269988 | A1 | 10/2008 | Feller |
| 2009/0099730 | A1 * | 4/2009 | McClure et al. ................. 701/41 |
| 2010/0018726 | A1 * | 1/2010 | Chiocco ............................ 172/1 |
| 2010/0023222 | A1 * | 1/2010 | Chiocco .......................... 701/44 |
| 2010/0023229 | A1 * | 1/2010 | Chiocco .......................... 701/50 |

* cited by examiner

*Primary Examiner* — Thomas Black
*Assistant Examiner* — Wae Louie
(74) *Attorney, Agent, or Firm* — K&L Gates LLP

(57) ABSTRACT

System and method for providing guidance control for machines. In one embodiment, a method includes detecting an implement, by a guidance controller, coupled to a machine. The method may further include determining a characteristic of the implement which affects a control setting of the machine, configuring the control setting of the machine by the guidance controller based, at least in part, on the characteristic of the implement and controlling operation of the machine based on the control setting.

21 Claims, 7 Drawing Sheets

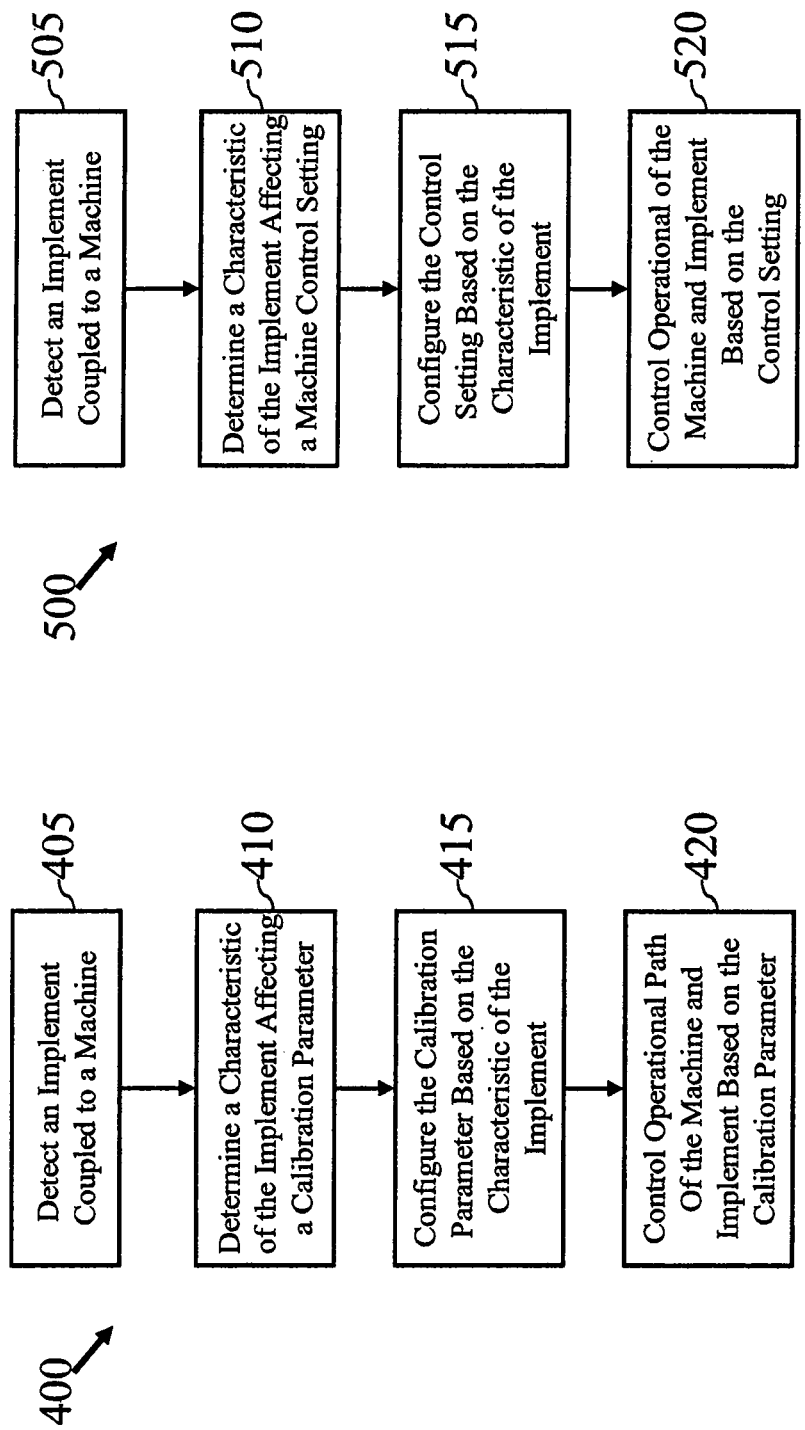

SYSTEM AND METHOD FOR MACHINE GUIDANCE CONTROL

FIELD OF THE INVENTION

The present invention relates in general to machine guidance and more particularly to a system and method for providing guidance control for machines.

BACKGROUND

Conventional global positioning systems can be used to provide navigation information. Some prior-art systems provide turn-by-turn directions and real-time driving information to operators of vehicles. However, direction data and driving information provided by these systems is typically restricted to road applications. As such, these systems typically do not provide information for applications which are not associated with an established roadway. Further, these systems may be limited in their abilities to guide different types of vehicles. In addition, such systems do not provide a high level of detail for guidance of a machine. Operation of some machines can require detailed guidance information. For example, machines which employ one or more implements. The prior-art systems for machine guidance typically do not address implements or attachments to machines. As a result, such guidance systems are limited in their ability to provide operational information to an operator.

Other prior-art systems provide guidance data for applications not based on established roadways. These conventional guidance systems do not account for operation and actuation of implements coupled to the machine. For agricultural and construction machines, operation may be required in many types of terrains and areas of varying topography. The conventional guidance systems do not address a location of the machine for guidance or operation. Accordingly, there is a need to configure guidance controllers to address machine configurations.

BRIEF SUMMARY OF THE INVENTION

Disclosed and claimed herein are a system and method for providing guidance control for machines. In one embodiment, a method includes detecting an implement, by a guidance controller, coupled to a machine. The method further includes determining a characteristic of the implement which affects a control setting of the machine, configuring the control setting of the machine by the guidance controller based, at least in part, on the characteristic of the implement, and controlling operation of the machine and the implement based on the control setting.

Other aspects, features, and techniques of the invention will be apparent to one skilled in the relevant art in view of the following detailed description of the invention.

BRIEF DESCRIPTION OF THE DRAWINGS

FIG. 4 depicts a process according to one or more embodiments of the invention;

FIG. 5 depicts a process according to one or more embodiments of the invention;

DETAILED DESCRIPTION OF EXEMPLARY EMBODIMENTS

Figure 1:
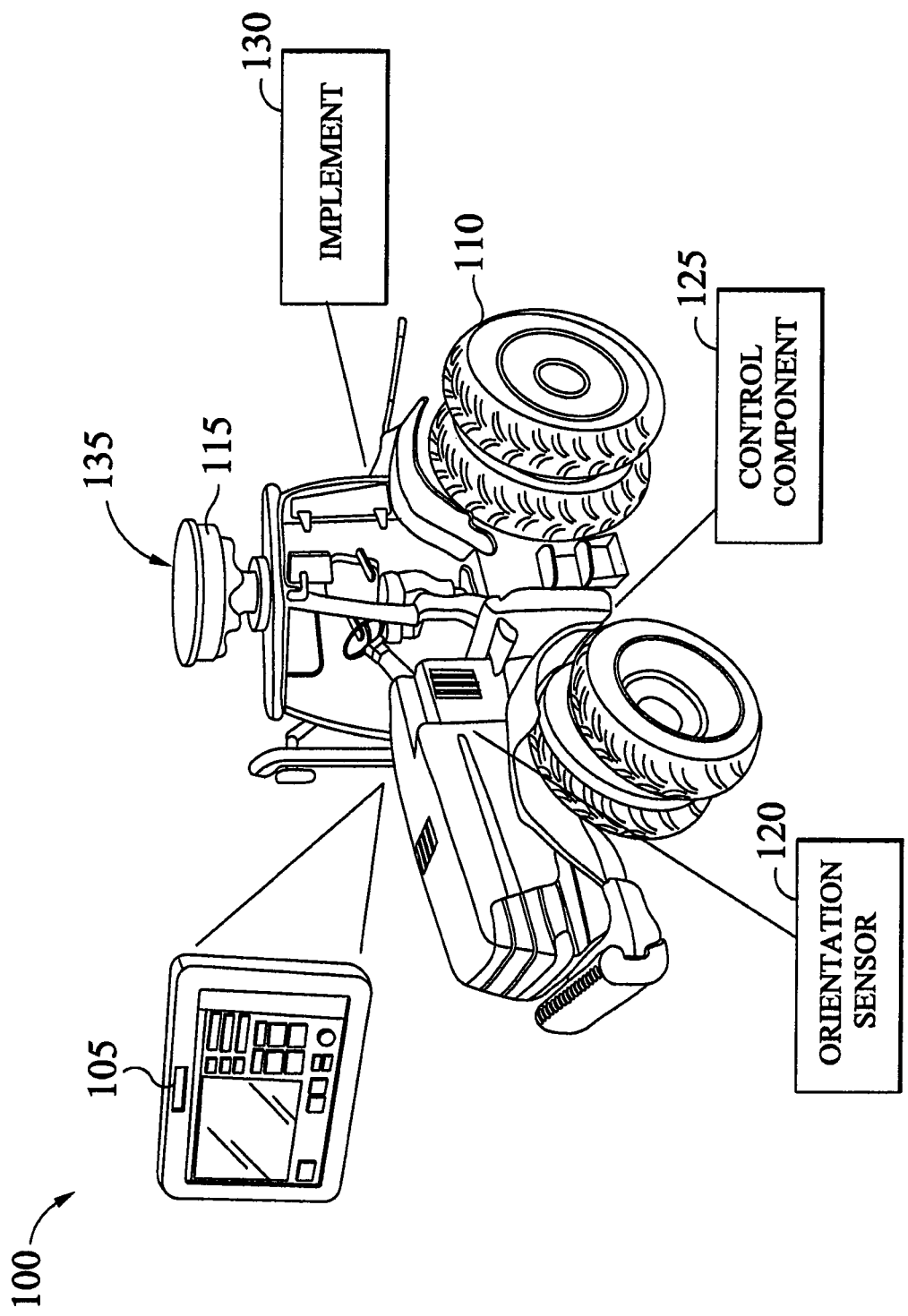
FIG. 1 depicts a simplified system diagram according to one or more embodiments of the invention.

One aspect of the present invention is directed to configuring guidance controllers for machines. In one embodiment, a guidance controller may be configured to provide guidance control for a machine based on one or more parameters. In another embodiment, a process may be provided to configure one or more calibration parameters of a guidance controller. According to another embodiment, calibration parameters may be based, at least in part, on an implement attached to the machine. In that fashion, implement specific information may be employed by a guidance system to provide control information. According to another embodiment, one or more implement characteristics may be employed to configure a control setting of a machine. For example, a guidance controller may be configured for a control device for operating the machine, compensating machine movement, operating an implement attached to the machine and/or positioning an implement attached to the machine. In another embodiment, a guidance controller may be configured based on a characteristic of a machine. By way of example, a guidance controller may be configured based on one of front wheel steering and rear wheel steering for the machine. To that end, a guidance controller can be configured to guide machine operation based on one or more of machine characteristics and implements coupled to the machine.

According to another embodiment, a system may be provided for machine guidance. The system may include a guidance controller and a machine. In one embodiment, the guidance controller may be configured to provide at least one of operational data for the machine and automated operation of the machine. In certain embodiments, the guidance controller may interoperate with a data communications network and/or global position source to provide data to an operator. The guidance controller may be in communication with the machine and one or more implements associated with the machine. In certain embodiments, the guidance controller can configure one or more parameters of the guidance controller based on an implement and/or the machine. In another embodiment, the guidance controller may be configured to detect implements and machines which the guidance controller is interoperating with.

According to another aspect of the invention, a guidance controller may be configured based, at least in part, on a location a machine is operating. A location associated with the machine may require a particular configuration. Characteristics of the location may be employed for configuration of one or more guidance parameters of the guidance controller. Based on location characteristics of the machine, configuration parameters and/or control settings may be adjusted.

When implemented in software, the elements of the invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, etc. The code segments may be downloaded via computer networks such as the Internet, Intranet, etc.

Referring now to the drawings, FIG. 1 illustrates a simplified system diagram for a machine employing a guidance controller according to one or more embodiments of the invention. As shown in FIG. 1, system 100 includes guidance controller 105 which may be configured to provide guidance data for machine 110. Guidance data may be provided based on characteristics of machine 110 and/or implement 130. In one embodiment, guidance controller 105 may be coupled to positioning receiver 115 to receive one or more global positioning signals, shown as 135. Guidance controller 105 can provide positioning data and guidance data based on received global positioning signals 135. Machine 110 may relate to one or more of a construction machine, earth moving machine, agricultural machine and machine in general. According to another embodiment, machine 110 may include orientation sensor 120 configured to sense the arrangement and/or orientation of machine 110. Orientation sensor 120 can provide one or more output signals to guidance controller 105 which may be used for guidance of machine 110. According to another embodiment, machine 110 may include a control component 125 to operate one or more components of the machine. By way of example, control component 125 may relate to a control valve configured to convert electrical signals received from guidance controller 105 to commands for operation of machine 110. It may also be appreciated that control component 125 may be utilized for one or more of steering machine 110, operating machine 110, positioning an implement and operating an implement.

Continuing to refer to system 100 of FIG. 1, machine 110 may be configured to support one or more implements. As shown in FIG. 1, machine 110 may be coupled to implement 130. Guidance controller 105 may be configured to provide one or more guidance controls based on a characteristic of implement 130. Guidance controls and guidance data provided by guidance controller 105 may be based on one or more calibration parameters of guidance controller 105. As used herein, a calibration parameter may relate to an adjustable quantity for governing an aspect for which guidance is provided for machine 110. By way of example, a calibration parameter may relate to one or more of a turning radius, steering parameter, angle of wheel turn per revolution, steering aggressiveness, wheel base, etc. According to another embodiment, guidance controller 105 may be configured to detect one or more of guidance sensor 120, control valve 125 and implement 130 by a wired and/or wireless link. In one embodiment, guidance controller 105 may be interoperated with one or more machine types. When moved to a new machine, guidance controller 105 can configure one or more calibration parameters based on the machine. While machine 110 is shown as a tractor, it may be appreciated that machine 110 may relate to other types of machines in general.

Figure 2:
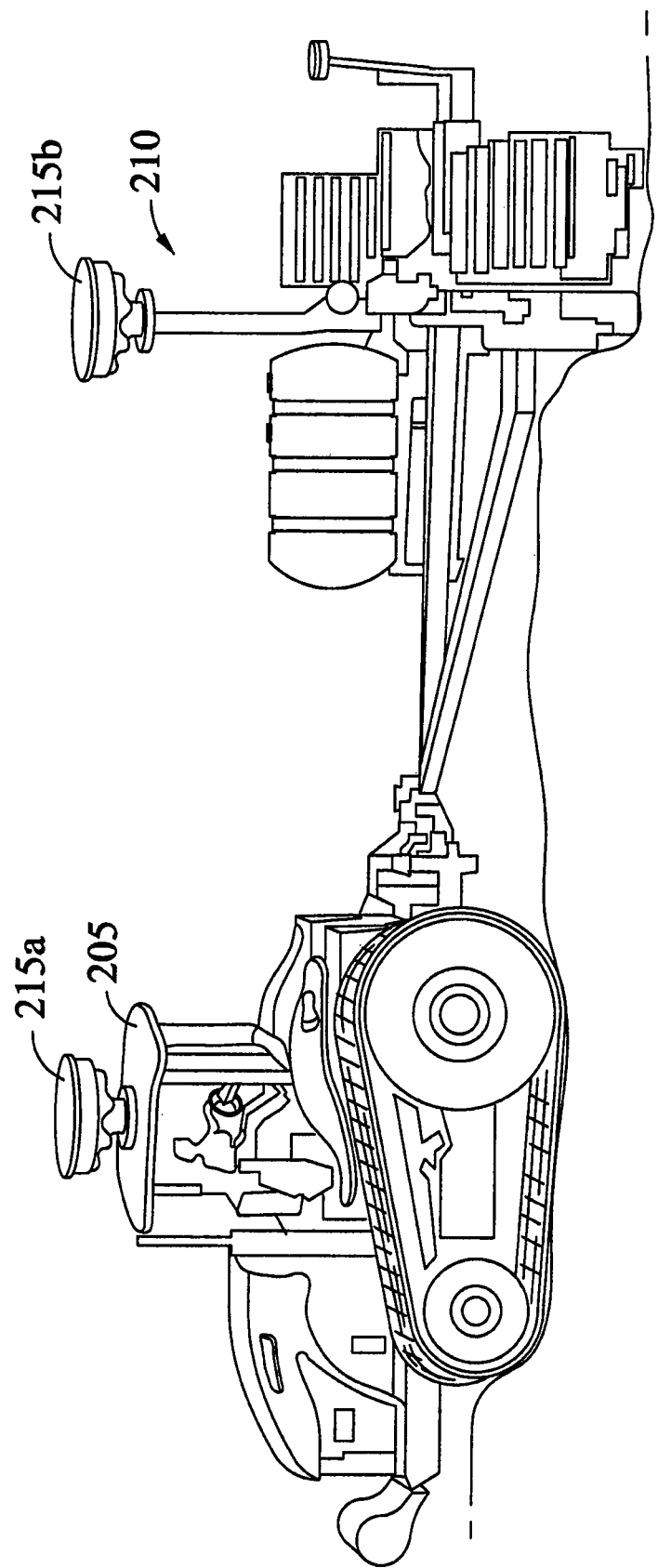
FIG. 2 depicts another embodiment of the system of FIG. 1.

Referring now to FIG. 2, a system diagram is shown for another embodiment of the system of FIG. 1. As shown in FIG. 2, machine 205 (e.g., machine 110) is coupled to implement 210. In one embodiment, machine 205 can provide power for implement 210. Implement 210 is shown as a pull-behind planter. It may be appreciated that implement 210 may relate to other types of implements, such as planters, field preparation implements, harvesting implements, grading and/or spraying. According to one embodiment, a guidance controller (e.g., guidance controller 105) may be configured to provide guidance information for machine 205 based on one or more of a characteristic of machine 205, characteristic of implement 210 and location associated with one of machine 205 and implement 210. It may be appreciated that location data may be sensed by one or more of GPS receivers 215a-215b (e.g., positioning receiver 115). The guidance controller can communicate with receivers 215a-215b to receive location data associated with machine 205 and/or implement 210.

Figure 3:
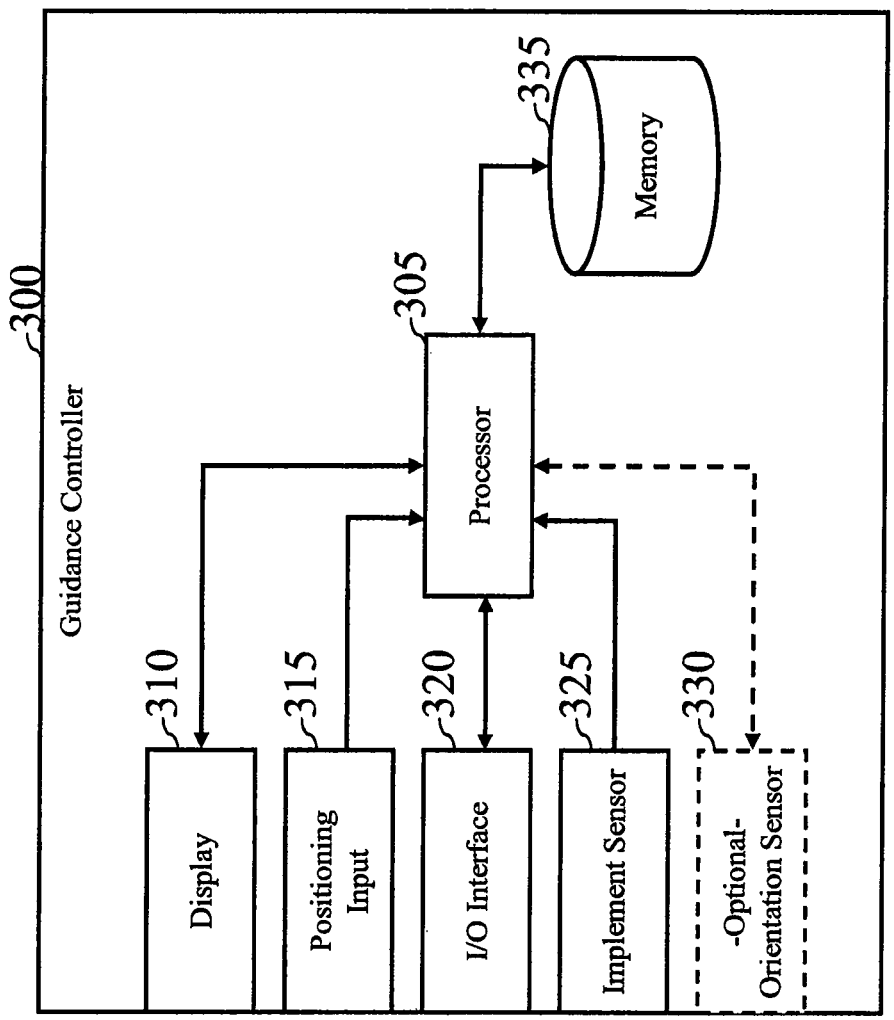
FIG. 3 depicts a simplified block diagram of a guidance controller according to one embodiment of the invention.

Referring now to FIG. 3, a simplified block diagram is shown of a guidance controller which may be employed by the system of FIG. 1, according to one embodiment of the invention. As shown in FIG. 3, guidance controller 300 (e.g., guidance controller 105) includes processor 305 which may be configured for one or more of providing guidance data, configuring calibration parameters, configuring guidance parameters and machine guidance in general. As used herein, a guidance parameter may relate to one or more parameters which may be utilized to direct machine operation. Processor 305 may provide guidance information to an operator of a machine (e.g., machine 110) using display 310. Processor 305 can be any type of processor, such as a microprocessor, field programmable gate array (FPGA) and/or application specific integrated circuit (ASIC). It may also be appreciated that data received by processor 305 may be stored in memory 335. Memory 335 may be any type of memory, such as ROM and RAM memory. It may also be appreciated that memory 335 may be configured to store machine records for passage data, path data, machine characteristics, implement characteristics and/or field data.

In one embodiment, guidance controller 300 may be configured to receive position data by positioning input 315. Positioning input 315 may be coupled to a positioning receiver (e.g., positioning receiver 115) providing positioning data related to one or more of global navigation satellite system (GNSS) data, global positioning system (GPS) data and geo-spatial positioning data in general. Guidance controller 300 may utilize input/output interface (I/O) 320 to communicate with machine components and/or implements. According to another embodiment, guidance controller 300 may include implement sensor 325 to detect one or more implements (e.g., implement 130) coupled to a machine (e.g., machine 110). Implement sensor 325 may be configured to detect implements over a wired and/or wireless link. By way of example, implement sensor 325 may be configured to detect an implement by one or more of radio frequency identification (RFID), direct cable connection, an IEEE 802.11x standard, Bluetooth® standard and a communication link in general.

According to another embodiment, guidance controller 300 may include an optional orientation sensor 330 configured to sense the orientation of a machine (e.g., machine 110). Optional orientation sensor 330 may be configured to provide one or more signals to processor 305 to correct for position of the machine. For example, in certain embodiments, processor 305 may be configured to correct for machine roll, machine pitch and/or machine yaw which may affect a determined location of the machine. It may also be appreciated that guidance controller 300 may receive similar correction data from a machine orientation sensor (e.g., orientation sensor 120) coupled to I/O interface 320. In one embodiment, guidance controller 300 may be a stand alone device which may be configurable for a plurality of machines. It may also be appreciated that guidance controller 300 may be integrated with one or more components of a machine (e.g., machine 105).

Referring now to FIG. 4, process 400 is shown for configuring guidance controllers according to one or more embodiments of the invention. Process 400 may be initiated by a guidance controller (e.g., guidance controller 105) detecting an implement coupled to a machine at block 405. In one embodiment, the guidance controller can detect the implement over one of a wired and wireless link. A characteristic of the implement may be determined by the guidance controller which affects a calibration parameter of the guidance controller at block 410. For example, the characteristic of the implement can relate to one or more of a physical dimension, physical off-set, identification, number of planting rows, range of maneuverability, speed constraint, swath width, operational reach of the implement serial number, application rate selection control capability, seed density, fertilizer density, population sensor calibration, tank size, seed delivery mechanism, blockage sensor calibration, number of channels and seed variety. At block 415, the calibration parameter of the guidance controller may be configured based, at least in part, on the characteristic of the implement. In one embodiment, the calibration parameter can relate to one or more of turning radius, compensation for slope in steering, angle of wheel turn per revolution, aggressiveness in steering, wheel base, front wheel steering, rear wheel steering and speed limit. According to another embodiment, the guidance controller can output a steering control signal based on the characteristic of the implement determined at block 410.

At block 420, the guidance controller can control an operational path of the machine and implement based on the calibration parameter. Controlling the operational path can comprise guiding a machine along a path setting as will be described in more detail with respect to FIG. 8 below. Process 400 may further include identifying a machine, detecting a characteristic of the machine and configuring a calibration parameter of the guidance controller based on a characteristic of the machine. According to another embodiment, process 400 may include the guidance controller determining an estimated time for completion of the operational path.

Referring now to FIG. 5, process 500 is shown for providing guidance control for a machine (e.g., machine 110) according to one or more embodiments of the invention. Process 500 may be initiated by a guidance controller (e.g., guidance controller 105) detecting an implement coupled to a machine (e.g., machine 110) at block 505. In one embodiment, the guidance controller can detect the implement over one of a wired and wireless link. A characteristic of the implement which affects a control setting of the machine may be determined at block 510. According to one embodiment, the characteristic of the implement relates to one or more of a physical dimension, weight, physical off-set, identification, number of planting rows, range of maneuverability, speed constraint, swath width, operational reach of the implement serial number, application rate selection control capability, seed density, fertilizer density, population sensor calibration, tank size, seed delivery mechanism, blockage sensor calibration, number of channels and seed variety. A control setting of the machine may be configured by the guidance controller based, at least in part, on the characteristic of the implement at block 515. The control setting may relate to control settings for one or more of machine steering, compensating machine movement, operation of the implement, positioning of the implement and control of machine speed. Further, the guidance controller may output a steering control signal based on the characteristic of the implement. The guidance controller can control operation of the machine and the implement based on the control setting at block 520. According to one embodiment, controlling operation based on a control setting may comprise converting electrical control signals to hydraulic commands. Process 500 may further include detecting a movement characteristic of the machine and configuring the control setting to compensate for the movement characteristic of the machine. In another embodiment, one or more of electrical power, hydraulic power and/or rotational power may be applied to the implement based on the control setting.

In another embodiment, it may also be appreciated that process 500 may be initiated when a guidance controller (e.g., guidance controller 105) is moved from one machine (e.g., machine 110) to another. For example, when the guidance machine is moved from a tractor used for planting a crop to a combine which will harvest the crop, process 500 may be employed.

Figure 6:
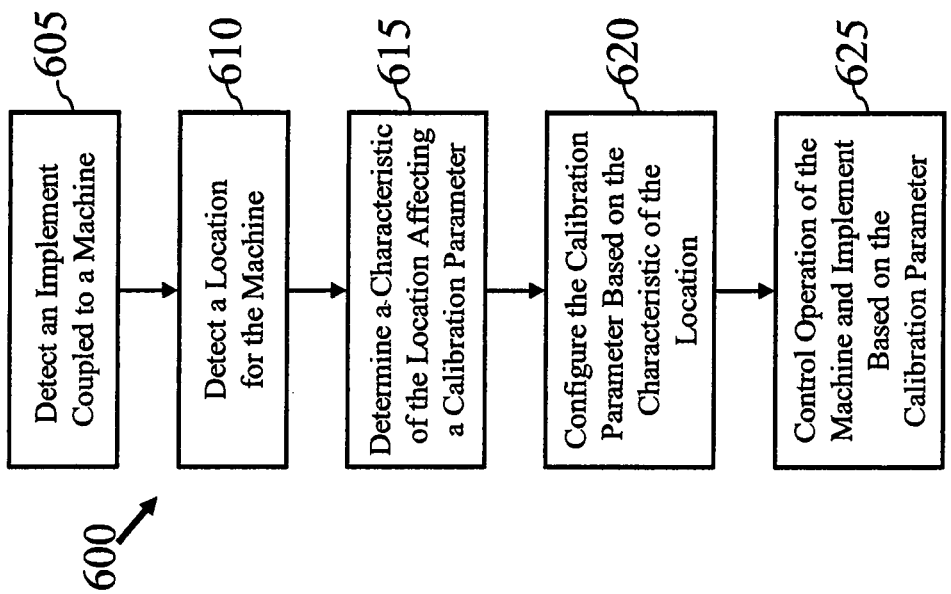
FIG. 6 depicts a process according to one or more embodiments of the invention.

Referring now to FIG. 6, process 600 is shown for location based configuration of a guidance controller (e.g., guidance controller 105) according to one or more embodiments of the invention. Process 600 may be initiated by a guidance controller detecting an implement coupled to a machine (e.g., machine 110) at block 605. Location data may be detected for the machine by the guidance controller at block 610. In one embodiment, location data may relate to at least one of global navigation satellite system (GNSS) data, global positioning system (GPS) data and geo-spatial positioning data in general. According to one embodiment, a characteristic of the location which affects a calibration parameter of the guidance controller may be determined at block 615. The characteristic of the location can relate to one or more of a terrain type, terrain slope, soil density, soil hardness, type of vegetation and obstructions. The calibration parameter of the guidance controller may be configured based, at least in part, on the characteristic of the location at block 620. According to another embodiment, the calibration parameter may relate to one or more of turning radius, compensation for slope in steering, angle of wheel turn per revolution, aggressiveness in steering, wheel base, front wheel steering, rear wheel steering, speed limit, torque, power for implement, implement positioning, hydraulic system characteristics, machine geometry, antenna height, antenna offset and steering geometry. Operation of the machine and implement may be controlled based on the calibration parameter at block 625. Control operation may relate to guiding a machine along a path setting, converting electrical control signals to hydraulic commands and/or configuring the control setting to compensate for the movement characteristic of the machine. Process 600 may further include outputting a steering control signal by the guidance controller based on the characteristic of the implement.

Figure 7:
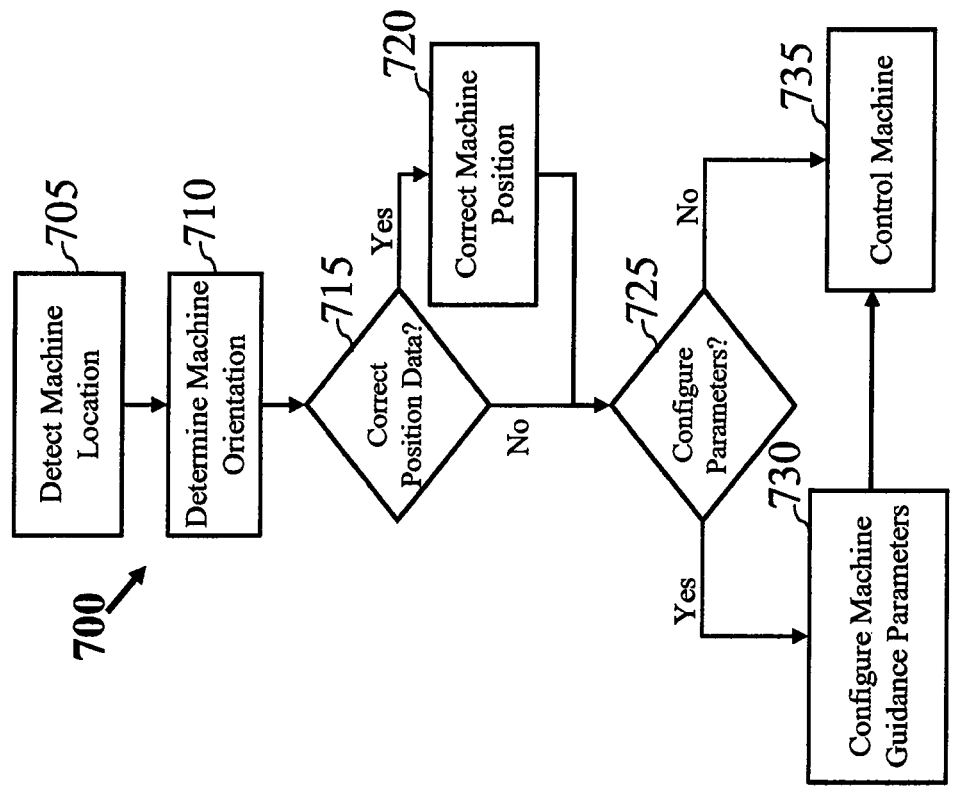
FIG. 7 depicts a process according to one or more embodiments of the invention.

Referring now to FIG. 7, a process is shown for configuring a guidance controller according to one or more embodiments of the invention. Process 700 may be initiated by a guidance controller (e.g., guidance controller 105) detecting a location of a machine (e.g., machine 110) at block 705. At block 710, the guidance controller can determine the orientation of the machine. In certain embodiments, receivers may produce an offset position measurement for machines operating on slopes due to an angular orientation of the machine. Similar offsets for position of an implement (e.g., implement 130) may occur due to terrain. The guidance controller may utilize one or more output signals from an orientation sensor (e.g., orientation sensor 120) to correct for offsets. A guidance controller can determine if position data requires correction at block 715. Determining if position data requires correction at block 715 may be based on a predetermined threshold. The guidance controller can determine an amount of offset based on an angle of the machine, including roll, pitch and yaw angle. Further, due to angular tilt of the machine, a positioning receiver (e.g., positioning receiver 115) of the machine may be offset due to an angle of the machine. When the guidance controller determines that correction is required (e.g., "Yes" path out of block 715), the guidance controller can correct machine position at block 720. By way of example, position correction by the guidance controller at block 720 may comprise recalculating a central position of the machine. According to another embodiment, the controller may further be configured to correct positioning of an implement. For example, the guidance controller can determine if positioning of an implement and/or calibration parameters should be corrected. Correction of calibration parameters may improve performance and/or reduce wear. However, when position correction is not required (e.g., "No" path out of block 720), the guidance controller can determine if parameters of the guidance controller require configuration at block 725.

In one embodiment, when the guidance controller determines that parameters require configuration (e.g., "Yes" path out of block 725), parameters of the guidance controller may be configured at block 730. For example, calibration parameters of the guidance controller, guidance parameters of an implement and/or configuration of a control valve (e.g., control component 125) may be configured at block 730. It may be appreciated that parameters may be configured dynamically at block 730. When parameters of the guidance controller do not require configuring (e.g., "No" path out of block 725), the guidance controller can control the machine at block 735. To that end, parameters for a guidance controller may be configured during operation of a machine. It may be advantageous for control parameters of components of the machine to be adjusted by process 700 to optimize implement functions and in some instances reduce wear of the machine and/or implement.

Figure 8:
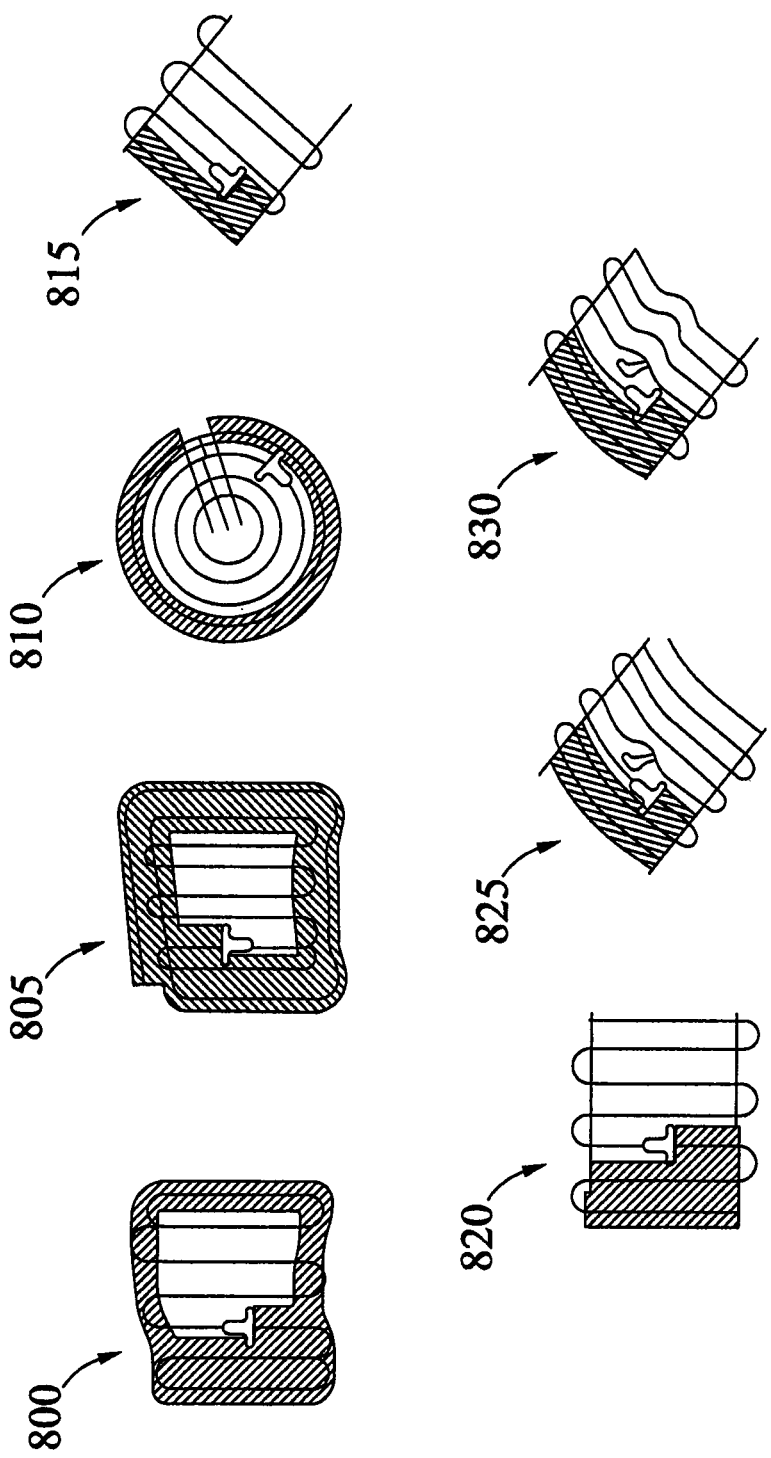
FIG. 8 depicts a graphical representation of operational paths according to one or more embodiments of the invention.

Referring now to FIG. 8, exemplary operational paths are shown according to one or more embodiments of the invention. In one embodiment, a guidance controller (e.g., guidance controller 105) can provide operational data and/or control signals for guidance of a machine (e.g., machine 110) according to one or more guidance paths. As shown in FIG. 8, exemplary guidance paths provided by the guidance controller relate to one or more of a headland path 805, multi-headland path 810, pivot path 815, A+ pattern path 820, A–B pattern path 825, identical curve path 830 and adaptive curve path 835. It should be appreciated that other path types may similarly be provided by a guidance controller (e.g., guidance controller 105). Further, paths shown in FIG. 8 may be provided by the guidance controller based on terrain obstructions.

Figure 9:
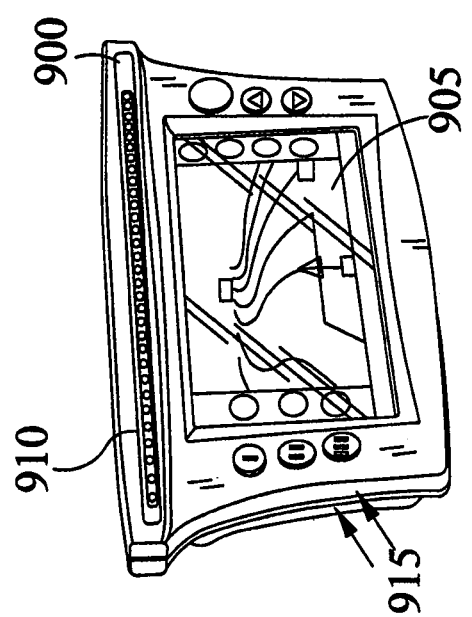
FIG. 9 depicts a graphical representation of a guidance controller according to one or more embodiments of the invention.

Referring now to FIG. 9, a graphical representation is shown of a guidance controller which may be employed by the system of FIG. 1. As show in FIG. 9, guidance controller 900 (e.g., guidance controller 105) may include a display 905 (e.g., display 310), light bar 910 and user terminals 915. In one embodiment, display 905 may be utilized to illustrate a desired path of the machine, previous pass data of the machine, upcoming turn indications, time to turn, changes in configurations for calibration and/or guidance parameters. According to another embodiment, display 905 may relate to a touch screen display which an operator of the machine (e.g., machine 110) may use to enter commands. Light bar 910 can provide visual feedback of machine path and steering information. Input terminals 915 of the guidance controller 900 may be utilized by an operator to input commands and controller navigation functions. In yet another embodiment, guidance controller 900 may be configured to interoperate with mapping applications.

Figure 10:
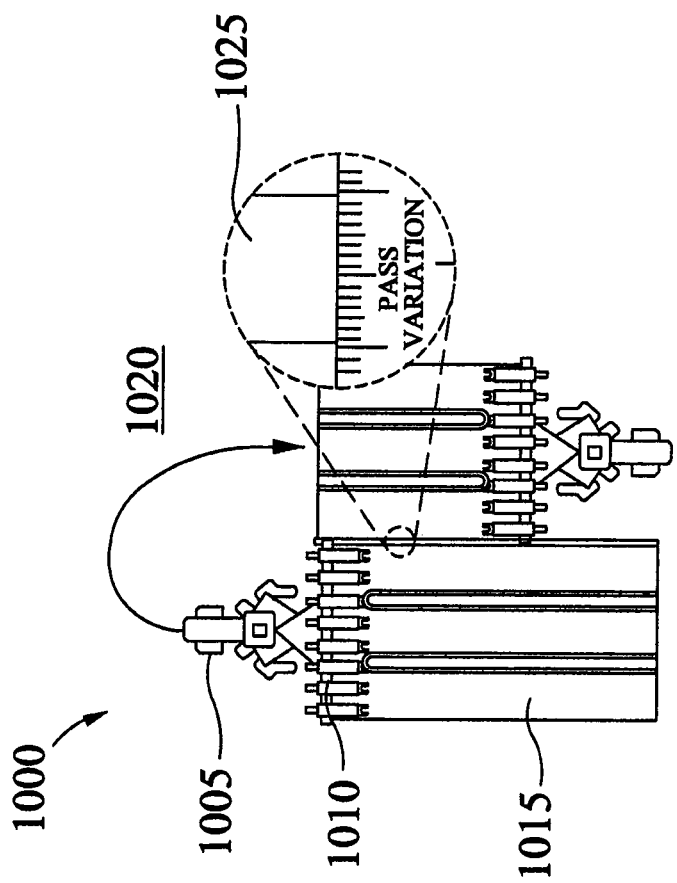
FIG. 10 depicts a graphical representation of guided machine control according to one or more embodiments of the invention.

Referring now to FIG. 10, a graphical representation is shown of guided machine control according to one or more embodiments of the invention. As shown in FIG. 10, machine 1005 (e.g., machine 110) and implement 1010 (e.g., implement 115) may be guided by a guidance controller (e.g., guidance controller 105) to have an operational path which covers swath 1015. According to one embodiment of the invention, the guidance controller may be configured to provide one or more instructions and/or visual cues to an operator of machine 1005 such that the machine can turn 180 degrees as shown by 1020. Machine maneuvering provided by the guidance controller may allow for a pass-to-pass variations shown as 1025. In one embodiment of the invention, pass-to-pass variation 1025 may relate to a range of 1"-8" year-to-year variation. In that fashion, repeatability of machine control may maximize efficiency and coverage of implement.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for providing guidance control for machines, the method comprising the acts of:
   detecting an implement, by a guidance controller, coupled to a machine;
   determining, by a guidance controller, a characteristic of the implement which affects a control setting of the machine;
   configuring the control setting of the machine by the guidance controller based, at least in part, on the characteristic of the implement and a characteristic of the machine, wherein the control setting is configured to compensate for movement of the machine; and
   controlling operation of the machine based on the control setting.

2. The method of claim 1, wherein detecting the implement by the guidance controller comprises detecting the implement over one of a wired and wireless link.

3. The method of claim 1, wherein the characteristic of the implement relates to one or more of a physical dimension, weight, physical off-set, identification, number of planting rows, range of maneuverability, speed constraint, swath width and operational reach of the implement.

4. The method of claim 1, wherein the control setting relates to control settings for one or more of machine steering, operation of the implement, positioning of the implement and control of machine speed.

5. The method of claim 1, wherein controlling operation comprises converting electrical control signals to hydraulic commands.

6. The method of claim 1, further comprising detecting movement characteristic of the machine and configuring the control setting to compensate for the movement characteristic of the machine.

7. The method of claim 1, further comprising applying power to the implement based on the control setting.

8. The method of claim 7, wherein power relates to one or more of electrical power, hydraulic power, rotational power and power in general.

9. The method of claim 1, further comprising outputting a steering control signal by the guidance controller based on the characteristic of the implement.

10. A system comprising:
a machine;
an implement coupled to the machine; and
a guidance controller configurable to interoperate with the machine and implement, the guidance controller configured to:
detect the implement;
determine a characteristic of the implement which affects a control setting of the machine;
configure the control setting of the machine based, at least in part, on the characteristic of the implement and a characteristic of the machine, wherein the control setting is configured to compensate for movement of the machine; and
controlling operation of the machine based on the control setting.

11. The system of claim 10, wherein detecting the implement by the guidance controller comprises detecting the implement over one of a wired and wireless link.

12. The system of claim 10, wherein the characteristic of the implement relates to one or more of a physical dimension, weight, physical off-set, identification, number of planting rows, range of maneuverability, speed constraint, swath width and operational reach of the implement.

13. The system of claim 10, wherein the control setting relates to control settings for one or more of machine steering, operation of the implement, positioning of the implement and control of machine speed.

14. The system of claim 10, wherein controlling operation comprises converting electrical control signals to hydraulic commands.

15. The system of claim 10, further comprising detecting movement characteristic of the machine and configuring the control setting to compensate for the movement characteristic of the machine.

16. The system of claim 10, further comprising applying power to the implement based on the control setting.

17. The system of claim 16, wherein power relates to one or more of electrical power, hydraulic power, rotational power and power in general.

18. The system of claim 10, further comprising outputting a steering control signal by the guidance controller based on the characteristic of the implement.

19. The system of claim 10, wherein the machine relates to one or more of an earthmoving machine, agricultural machine, vehicle, construction machine and machine in general having an implement.

20. The system of claim 10, wherein the implement relates to one of a grader, sprayer, land preparation, planter, pull-behind implement, combine, trailer and implement in general.

21. A computer program product comprising:
a computer readable medium having computer executable program code embodied therein to configure guidance controllers, the computer executable program product having;
computer executable program code to detect an implement, by a guidance controller, coupled to a machine;
computer executable program code to determine a characteristic of the implement which affects a control setting of the machine;
computer executable program code to configure the control setting of the machine by the guidance controller based, at least in part, on the characteristic of the implement and a characteristic of the machine, wherein the control setting is configured to compensate for movement of the machine; and
computer executable program code to control operation of the machine based on the control setting.

* * * * *